US011686934B2

(12) United States Patent
Flohr

(10) Patent No.: US 11,686,934 B2
(45) Date of Patent: Jun. 27, 2023

(54) REMOTE CONTROL OF A SCANNER USING MOVEMENT OF A MOBILE COMPUTING DEVICE

(71) Applicant: FARO Technologies, Inc., Lake Mary, FL (US)

(72) Inventor: Daniel Flohr, Stuttgart (DE)

(*) Notice: Subject to any disclaimer, the term of this patent is extended or adjusted under 35 U.S.C. 154(b) by 1346 days.

(21) Appl. No.: 16/106,237

(22) Filed: Aug. 21, 2018

(65) Prior Publication Data

US 2019/0064510 A1 Feb. 28, 2019

Related U.S. Application Data

(60) Provisional application No. 62/552,520, filed on Aug. 31, 2017.

(51) Int. Cl.
| | |
|---|---|
| G02B 26/10 | (2006.01) |
| G01B 11/25 | (2006.01) |
| G01B 11/00 | (2006.01) |
| G06F 3/0346 | (2013.01) |
| G01S 17/42 | (2006.01) |

(Continued)

(52) U.S. Cl.
CPC .......... *G02B 26/10* (2013.01); *G01B 11/005* (2013.01); *G01B 11/2518* (2013.01); *G01S 7/003* (2013.01); *G01S 7/4812* (2013.01); *G01S 7/4817* (2013.01); *G01S 7/51* (2013.01);
(Continued)

(58) Field of Classification Search
CPC .. G02B 26/10; G01B 11/005; G01B 11/2518; G01S 7/003; G01S 7/4812; G01S 7/4817; G01S 7/51; G01S 17/42; G01S 17/86; G06F 3/0346
See application file for complete search history.

(56) References Cited

U.S. PATENT DOCUMENTS

| 6,034,722 A | 3/2000 | Viney |
| 6,573,883 B1 | 6/2003 | Bartlett |

(Continued)

FOREIGN PATENT DOCUMENTS

| DE | 102013102544 A1 | 9/2014 |
| EP | 2431708 A1 | 3/2012 |

OTHER PUBLICATIONS

Extened European Search Report for International No. 18191201.5-1206, dated Jan. 7, 2019, 7 pages.

*Primary Examiner* — Roy M Punnoose
(74) *Attorney, Agent, or Firm* — McCarter & English, LLP; Dave S. Christensen

(57) ABSTRACT

A system and method of providing remote control of a scanner is provided. The system includes a laser scanner device rotatable around a first axis and that includes a mirror rotatable around a second axis. The system also includes a mobile computing device operably coupled for communication to the laser scanner. The mobile computing device includes a sensor to detect movement of the mobile computing device. The mobile computing device also includes one or more processors and computer instructions to perform a method that includes connecting to the laser scanner to transmit signals therebetween; detecting a motion of the mobile computing device; and causing the laser scanner to modify at least one of the first angle of rotation of the laser scanner about the first axis and the second angle of rotation of the mirror about the second axis in response to detecting motion of the mobile computing device.

18 Claims, 11 Drawing Sheets

(51) Int. Cl.
   *G01S 7/00*    (2006.01)
   *G01S 7/481*   (2006.01)
   *G01S 7/51*    (2006.01)
   *G01S 17/86*   (2020.01)

(52) U.S. Cl.
   CPC ............ *G01S 17/42* (2013.01); *G06F 3/0346* (2013.01); *G01S 17/86* (2020.01)

(56) References Cited

U.S. PATENT DOCUMENTS

| | | | |
|---|---|---|---|
| 7,847,922 B2 * | 12/2010 | Gittinger | G01C 15/06 356/141.5 |
| 8,279,522 B2 | 10/2012 | Fujimoto et al. | |
| 8,384,914 B2 | 2/2013 | Becker et al. | |
| 8,705,012 B2 | 4/2014 | Greiner et al. | |
| 8,730,477 B2 * | 5/2014 | Ruhland | G01J 3/46 356/402 |
| 8,705,016 B2 | 8/2014 | Schumann et al. | |
| 9,074,578 B2 | 7/2015 | Souply et al. | |
| 9,074,878 B2 * | 7/2015 | Steffey | G01S 7/4817 |
| 9,134,339 B2 | 9/2015 | Becker et al. | |
| 9,279,662 B2 * | 3/2016 | Steffey | G02B 26/10 |
| 9,645,240 B1 * | 5/2017 | Ossig | G01S 7/003 |
| 9,741,093 B2 * | 8/2017 | Becker | G06T 7/38 |
| 9,869,755 B2 * | 1/2018 | Becker | G01C 15/002 |
| 2012/0303176 A1 * | 11/2012 | Wong | G01S 17/89 701/1 |
| 2013/0229512 A1 * | 9/2013 | Steffey | G01S 7/003 348/135 |
| 2014/0240689 A1 | 8/2014 | Arbouzov | |
| 2015/0015895 A1 * | 1/2015 | Bridges | G01B 11/005 356/614 |
| 2015/0160343 A1 * | 6/2015 | Zweigle | G01S 17/36 356/5.04 |
| 2016/0138919 A1 * | 5/2016 | Green | G01C 15/002 348/135 |
| 2018/0203120 A1 * | 7/2018 | Nagalla | G01S 17/86 |

\* cited by examiner

REMOTE CONTROL OF A SCANNER USING MOVEMENT OF A MOBILE COMPUTING DEVICE

CROSS-REFERENCE TO RELATED APPLICATION

This application claims the benefit of U.S. Provisional Application No. 62/552,520, filed Aug. 31, 2017, and entitled "REMOTE CONTROL OF A SCANNER USING MOVEMENT OF A MOBILE COMPUTING DEVICE", the content of which is incorporated herein by reference in its entirety.

BACKGROUND

The subject matter described herein relates in general to a three-dimensional coordinate scanning system, and in particular to using motion sensors of a mobile computing device to remotely control a laser scanner.

Metrology devices, such as a three-dimensional (3D) laser scanner time-of-flight (TOF) coordinate measurement devices for example, may be used to generate 3D representations of areas, such as buildings for example. A 3D laser scanner of this type steers a beam of light to a non-cooperative target such as a diffusely scattering surface of an object. A distance meter in the device measures a distance to the object, and angular encoders measure the angles of rotation of two axes in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

When an operator requires a scan of a limited area, and not a full three-hundred and sixty degree (360°) scan, it can be very tedious to adjust the start and stop angles for scanner movement to capture the limited area. Typically a low-resolution scan is first recorded in order to be able to select an area for a more detailed scan. In addition, it can take multiple attempts by an operator to capture a desired scan area as the operator is approximating the direction of the scanner without visibly viewing the exact scan area of the scanner.

Accordingly, while existing scanning systems are suitable for their intended purposes, what is needed is a scanning system having certain features of embodiments of the present invention.

BRIEF DESCRIPTION

According to an embodiment of the present invention, a laser scanner system is provided. The laser scanner system includes a laser scanner device that is rotatable around a first axis and that includes a mirror rotatable around a second axis. The laser scanner device also includes a first emitter for launching a first light beam from the laser scanner, a distance meter, a first angular encoder for measuring a first angle of rotation of the laser scanner about the first axis, a second angular encoder for measuring a second angle of rotation of the mirror about the second axis, a camera positioned and oriented to acquire an image in the direction of the first light beam after it reflects off of the mirror, and one or more first processors. The laser scanner system also includes a mobile computing device operably coupled for communication to the laser scanner. The mobile computing device includes a sensor to detect movement of the mobile computing device and one or more second processors that are responsive to executable computer instructions. The executable computer instructions when executed on the one or more second processors perform a method that includes connecting to the laser scanner to transmit signals therebetween; detecting, by the sensor, a motion of the mobile computing device; and causing the laser scanner to modify at least one of the first angle of rotation of the laser scanner about the first axis and the second angle of rotation of the mirror about the second axis in response to detecting the motion of the mobile computing device.

In addition to one or more of the features described herein, or as an alternative, further embodiments of the system may include causing the mobile computing device to notify the laser scanner about the detected motion and the laser scanner modifying at least one of the first angle of rotation of the laser scanner about the first axis and the second angle of rotation of the mirror about the second axis responsive to the notifying and to the detected motion.

In addition to one or more of the features described herein, or as an alternative, further embodiments of the system may include displaying on a display of the mobile computing device the image acquired from the camera.

In addition to one or more of the features described herein, or as an alternative, further embodiments of the system may include modifying the first angle of rotation of the laser scanner about the first axis based at least in part on the motion being a movement of the mobile computing device around a third axis, and the laser scanner modifies the second angle of rotation of the mirror about the second axis based at least in part on the motion being a movement of the mobile computing device around a fourth axis.

In addition to one or more of the features described herein, or as an alternative, further embodiments of the system may include an amount that the laser scanner modifies the first angle of rotation or the second angle of rotation is based at least in part on a magnitude of the detected motion.

In addition to one or more of the features described herein, or as an alternative, further embodiments of the system may include the sensor being an accelerometer.

In addition to one or more of the features described herein, or as an alternative, further embodiments of the system may include the mobile computing device being operably coupled for communication to the laser scanner via a computer network.

According to an embodiment of the present invention, a method of remote control of a scanner using movement of a mobile computing device is provided. The method includes providing a laser scanner device that is rotatable around a first axis and that includes a mirror rotatable around a second axis. The laser scanner device also includes a first emitter that launches a first light beam from the laser scanner, a distance meter, a first angular encoder that measures a first angle of rotation of the laser scanner about the first axis, a second angular encoder that measures a second angle of rotation of the mirror about the second axis, and a camera positioned and oriented to acquire an image in the direction of the first light beam after it reflects off of the mirror. The method also includes providing a mobile computing device operably coupled for communication to the laser scanner. The mobile computing device includes a sensor to detect movement of the mobile computing device. The mobile communicating device: connects to the laser scanner to transmit signals therebetween; detects a motion of the mobile computing device; and causes the laser scanner to modify at least one of the first angle of rotation of the laser scanner about the first axis and the second angle of rotation of the mirror about the second axis in response to detecting the motion of the mobile computing device.

In addition to one or more of the features described herein, or as an alternative, further embodiments of the method may include causing the mobile computing device to notify the laser scanner about the detected motion and the laser scanner modifying at least one of the first angle of rotation of the laser scanner about the first axis and the second angle of rotation of the mirror about the second axis responsive to the notifying and to the detected motion.

In addition to one or more of the features described herein, or as an alternative, further embodiments of the method may include displaying on a display of the mobile computing device the image acquired from the camera.

In addition to one or more of the features described herein, or as an alternative, further embodiments of the method may include the laser scanner modifying the first angle of rotation of the laser scanner about the first axis based at least in part on the motion being a movement of the mobile computing device around a third axis, and the laser scanner modifies the second angle of rotation of the mirror about the second axis based at least in part on the motion being a movement of the mobile computing device around a fourth axis.

In addition to one or more of the features described herein, or as an alternative, further embodiments of the method may include an amount that the laser scanner modifies the first angle of rotation or the second angle of rotation is based at least in part on a magnitude of the detected motion.

In addition to one or more of the features described herein, or as an alternative, further embodiments of the method may include the sensor being an accelerometer.

In addition to one or more of the features described herein, or as an alternative, further embodiments of the method may include the mobile computing device being operably coupled for communication to the laser scanner via a computer network.

According to an embodiment of the present invention, a laser scanner system is provided. The laser scanner system including a laser scanner device. The laser scanner device being rotatable around a first axis and including a mirror rotatable around a second axis, a first emitter that launches a first light beam from the laser scanner, a distance meter, a first angular encoder that measures a first angle of rotation of the laser scanner about the first axis, a second angular encoder that measures a second angle of rotation of the mirror about the second axis, a camera positioned and oriented to acquire an image in the direction of the first light beam after it reflects off of the mirror, and one or more first processors that are responsive to executable instructions. The executable instructions when executed on the one or more first processors perform a method comprising: connecting to a mobile computing device to transmit signals therebetween; receiving a notification from the mobile communication device about a detected motion of the mobile communication device; and modifying at least one of the first angle of rotation of the laser scanner about the first axis and the second angle of rotation of the mirror about the second axis in response to receiving the notification and responsive to the detected motion.

In addition to one or more of the features described herein, or as an alternative, further embodiments of the method may include modifying at least one of the first angle of rotation of the laser scanner about the first axis and the second angle of rotation of the mirror about the second axis.

In addition to one or more of the features described herein, or as an alternative, further embodiments of the method may include modifying the first angle of rotation of the laser scanner about the first axis based at least in part on the detected motion being a movement of the mobile computing device around a third axis, and modifying the second angle of rotation of the mirror about the second axis based at least in part on the detected motion being a movement of the mobile computing device around a fourth axis.

In addition to one or more of the features described herein, or as an alternative, further embodiments of the method may include an amount that the first angle of rotation or the second angle of rotation is modified is based at least in part on a magnitude of the detected motion.

In addition to one or more of the features described herein, or as an alternative, further embodiments of the method may include a step wherein the amount is adjustable.

In addition to one or more of the features described herein, or as an alternative, further embodiments of the method may include a step where the connecting is via a computer network.

Technical effects of embodiments of the present disclosure include causing a laser scanning device to rotate about one or more axis in response to a motion by an operator. This allows the operator to easily control the position and operation parameters of the laser scanner device without having to physically touch the laser scanner device.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
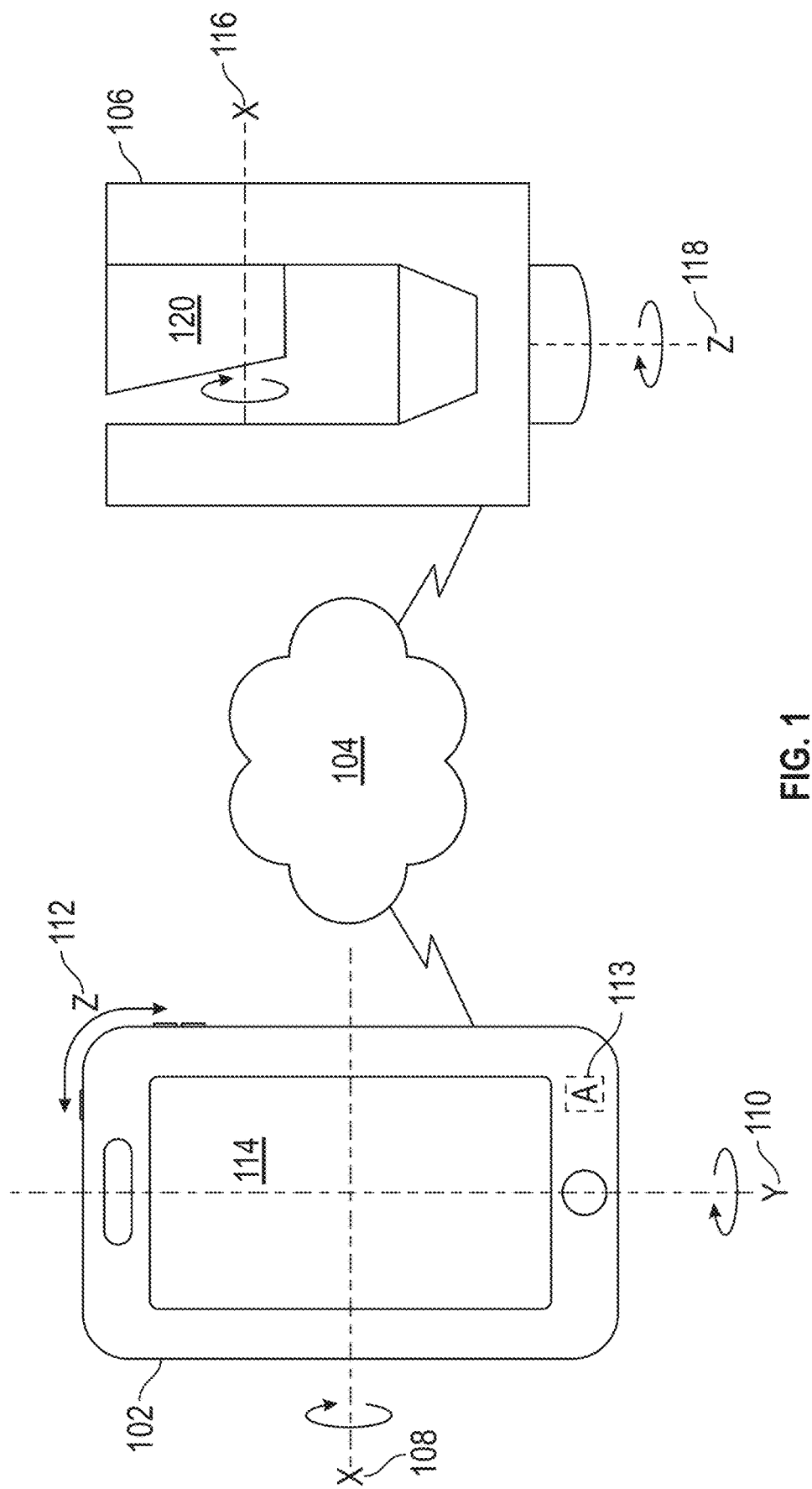
FIG. 1 is an illustration of a mobile computing device coupled to a scanner device via a network in accordance with one or more embodiments of the present invention.

The detailed description explains embodiments of the invention, together with advantages and features, by way of example with reference to the drawings.

DETAILED DESCRIPTION

Embodiments of the present invention relate to using motion of a mobile computing device to control an area being scanned by a scanner device. Sensors, such as accelerometers, in the mobile computing device detect a motion of the mobile computing device and based on the detected motion direct the scanner device, or a mirror(s) on the scanner device, to rotate around a horizontal and/or vertical axis to change a target scan area. In addition to changing the orientation of the scanner device, a display screen on the mobile computing device may display a live image taken by a camera located on the scanner to allow the user to navigate to an area of interest by motioning with the mobile computing device. Once an area of interest is identified, the scanner device may be instructed by the mobile computing device to capture measurement data for the area of interest.

Embodiments of the present invention provide advantages in allowing a user to operate a scanner device using a mobile computing device, such as a cellular telephone or a computer tablet for example. Embodiments of the present invention provide advantages in allowing the user to find scanner devices connected to a computer network with the mobile computing device and select a scanner device to operate. Still further embodiments of the present invention provide advantages in allowing the user to view an image acquired by a camera on the scanner device and change the orientation of the scanner device based on user input such as changing the orientation of the mobile computing device.

Embodiments of the present invention provide advantages over contemporary methods where it may be tedious or time consuming to adjust the start and stop angles for scanner movement when capturing scan data for less than a 360° scan. In accordance with embodiments described herein, the process of scanning a limited area is facilitated by coupling a mobile computing device to a scanner and entering a special mode to control the motion of the scanner axes via a scanner control application executing on the mobile computing device. Once the scanner control application is active, the operator uses the motion, or pose, of the mobile computing device to control the scanner motion. A screen on the mobile computing device may display a live image taken by a color camera located on the scanner device to allow the operator to navigate to the area of interest and define start/end edges of a limited angle scan by using, for example, a touch screen of mobile computing device to select points.

Embodiments of the present invention may also be used to add additional information to an already existing 360° scan. After the 360° scan is completed, the scanner control application may be started to navigate to a point of interest in the scan. The operator may use a touch screen on the mobile computing device to select a point where additional data (e.g. higher resolution data) should be attached. Additional data may then be recorded by using capabilities of the mobile computing device to record pictures, videos, voice message, web links and/or text for attachment to the scan results.

Referring now to FIG. 1, an illustration of a mobile computing device 102 coupled to a 3D scanner device 106 via a network 104 is generally shown in accordance with one or more embodiments of the present invention. As used herein, the term "mobile computing device" refers to a computing device having one or more processors, a display, and non-transitory memory that includes computer readable instructions. The mobile computing device 102 may also include a power source, such as a battery (not shown) for example, that allows the user to freely move about the environment with the mobile computing device 102. The mobile computing device 102 is sized and shaped to be carried by a single person. In an embodiment, the mobile computing device 102 may be but is not limited to a cellular phone, a tablet computer, or a convertible laptop computer for example. The mobile computing device 102 may further be a wearable computing device, such as a wrist watch or eye glasses having a processing circuit.

The mobile computing device 102 shown in FIG. 1 includes a display screen 114 and three identified axes of rotation including rotation around an X axis 108 (e.g., roll), a Y axis 110 (e.g., yaw), and a Z axis 112 (e.g., pitch). In one embodiment an accelerometer(s) 113 is used to detect, measure, and output rotation, or acceleration, around each of these axes. The mobile computing device 102 includes communication circuits that allow the mobile computing device 102 to transmit to and receive signals from the computer network 104. As will be discussed in more detail herein, the computer network 104 allows the mobile computing device 102 to transmit signals to and receive signals from one or more 3D scanner device 106.

The computer network 104 shown in FIG. 1 may include one or more nodes, such as a computer server for example. The computer network 104 may be any known computer network, such as but not limited to a local area network (LAN), a wide-area network (WAN), a cellular network or the Internet for example. In an embodiment, each of the scanner devices includes communications circuits, such as Ethernet (IEEE 802.3), WiFi (IEEE 802.11) or cellular communications circuits for example, that are configured to transmit to and receive signals from the computer network 104. As further discussed herein, the mobile computing device 102 may directly and wirelessly connect to the 3D scanner device 106 without using an external computing network 104.

The 3D scanner device 106 shown in FIG. 1 is coupled to the computer network 104 and includes two axes of rotation including an X axis 116 for a rotary mirror 120 to rotate around and a Z axis 118 for the 3D scanner device 106 to rotate around. In an embodiment, angular encoders are used to measure angles of rotation of the 3D scanner device 106 and the rotary mirror 120 around the axes 116, 118 in the 3D scanner device 106. A laser scanner device, which is an example of a 3D scanner device 106 that may be implemented by exemplary embodiments, is described below with reference to FIGS. 2-4.

Figure 2:
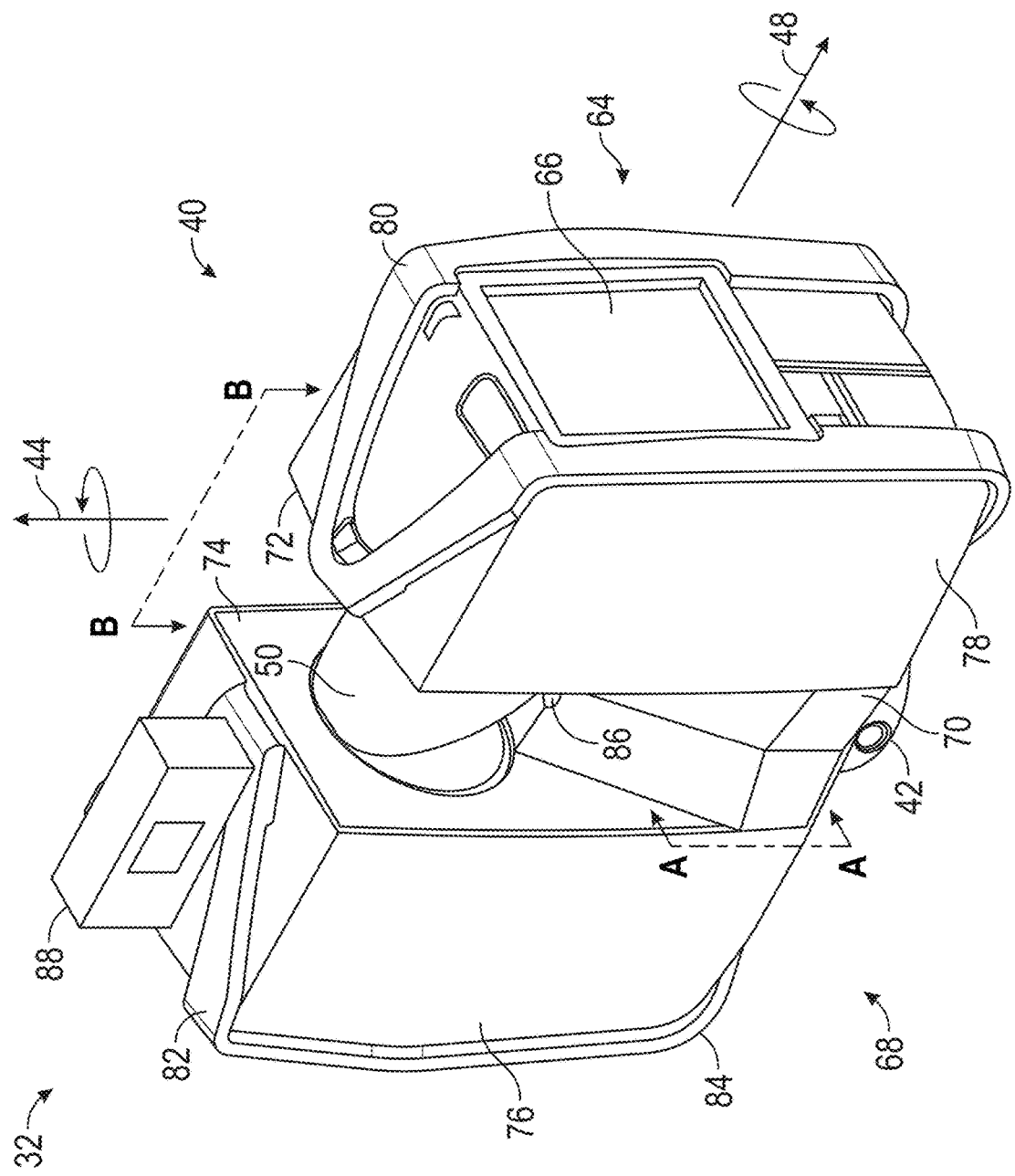
FIG. 2 is a perspective view of a laser scanner in accordance with one or more embodiments of the present invention.
Figure 3:
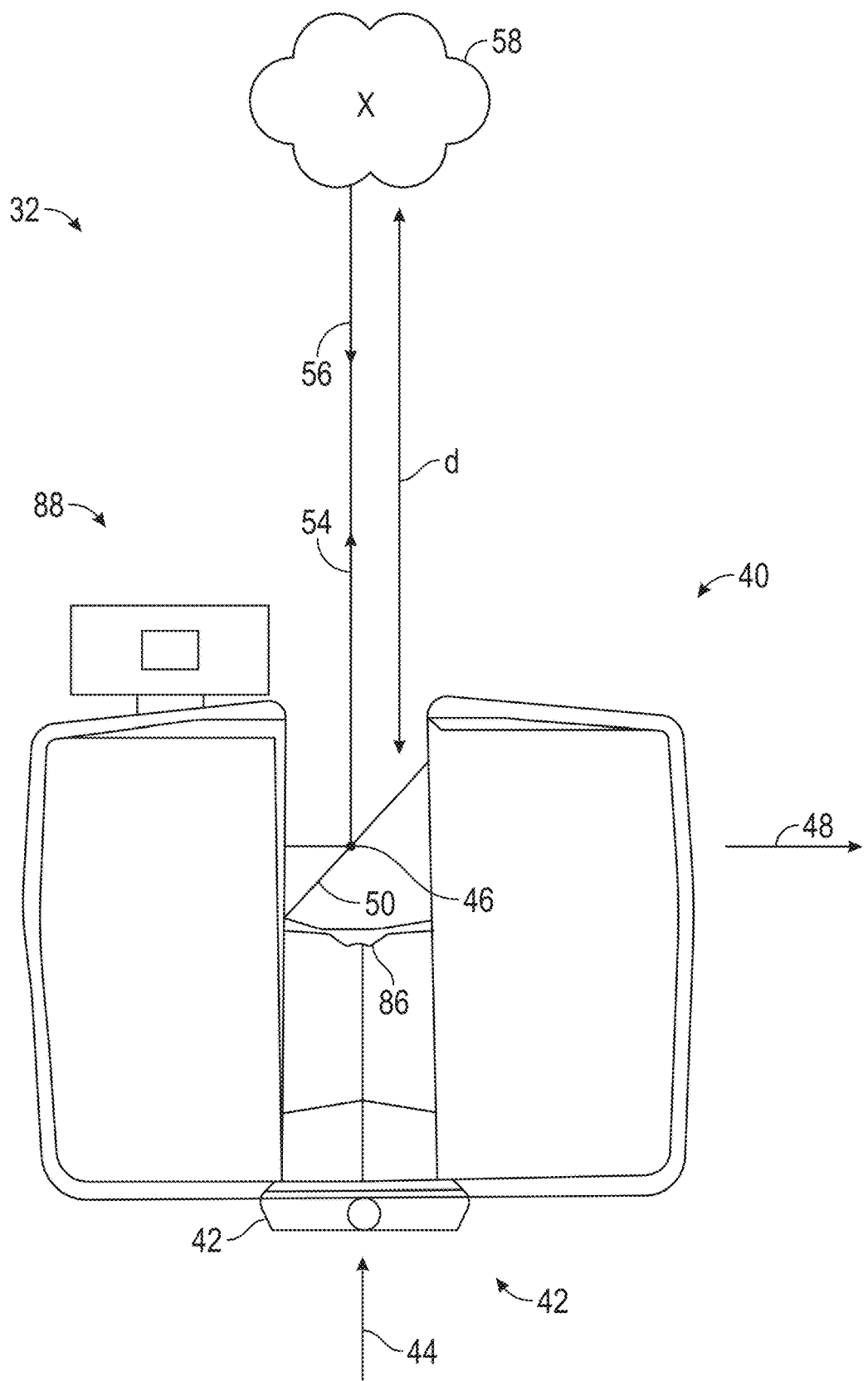
FIG. 3 is a side view of the laser scanner illustrating a method of measurement in accordance with one or more embodiments of the present invention
Figure 4:
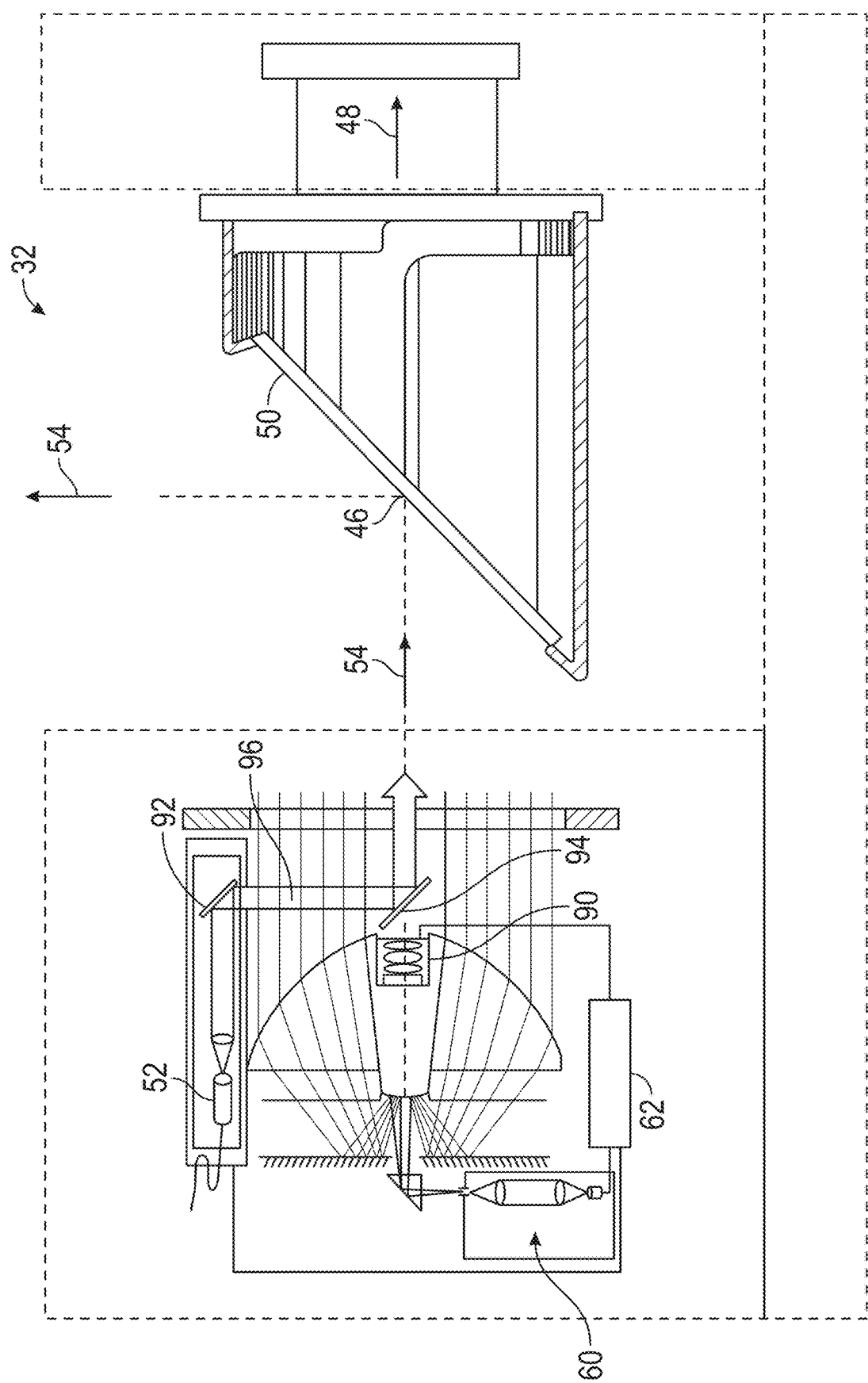
FIG. 4 is a schematic illustration partially in section along the line B-B of FIG. 2 of the optical, mechanical, and electrical components of the laser scanner in accordance with one or more embodiments of the present invention.

Referring now to FIGS. 2-4, a laser scanner 32 is shown for optically scanning and measuring the environment surrounding the laser scanner 32. The laser scanner 32 has a measuring head 40 and a base 42. The measuring head 40 is mounted on the base 42 such that the laser scanner 32 may be rotated about a vertical axis 44. In one embodiment, the measuring head 40 includes a gimbal point 46 that is a center of rotation about the vertical axis 44 and a horizontal axis 48. The measuring head 40 has a rotary mirror 50, which may be rotated about the horizontal axis 48. The rotation about the vertical axis may be about the center of the base 42. The terms vertical axis and horizontal axis refer to the scanner in its normal upright position. In other words, with the axis 44 extending approximately perpendicular to the floor or ground and the axis 48 being approximately parallel with the floor or ground. It should be appreciated that it is also possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative nomenclature for the vertical axis.

The measuring head 40 is further provided with an electromagnetic radiation emitter, such as light emitter 52, for example, that emits an emitted light beam 54. In one embodiment, the emitted light beam 54 is a coherent light beam such as a laser beam. The laser beam may have a wavelength range of approximately 300 to 1600 nanometers, for example 790 nanometers, 905 nanometers, 1550 nanometers, or less than 400 nanometers. It should be appreciated that other electromagnetic radiation beams having greater or smaller wavelengths may also be used. The emitted light beam 54 may be amplitude or intensity modulated, for example, with a sinusoidal waveform or with a rectangular waveform. The emitted light beam 54 is emitted by the light emitter 52 onto the rotary mirror 50, where it is deflected to the environment. A reflected light beam 56 is reflected from the environment by an object 58. The reflected or scattered light is intercepted by the rotary mirror 50 and directed into a light receiver 60. The directions of the emitted light beam 54 and the reflected light beam 56 result from the angular positions of the rotary mirror 50 and the measuring head 40 about the axes 44, 48 respectively. These angular positions in turn depend on the corresponding rotary drives or motors.

Coupled to the light emitter 52 and the light receiver 60 is a 3D scanner processor, or controller 62. The controller 62 determines, for a multitude of measuring points X, a corresponding number of distances d between the laser scanner 32 and the points X on object 58. The distance to a particular point X is determined (e.g., by a distance meter implemented by the controller 62) based at least in part on the speed of light in air through which electromagnetic radiation propagates from the device to the object point X. In one embodiment the phase shift of modulation in light emitted by the laser scanner 32 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$.

A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the TOF of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In addition to measuring a distance d from the gimbal point 46 to an object point X, the laser scanner 32 may also collect gray-scale information related to the received optical power (equivalent to the term "brightness.") The gray-scale value may be determined at least in part, for example, by integration of the bandpass-filtered and amplified signal in the light receiver 60 over a measuring period attributed to the object point X.

The measuring head 40 may include a display device 64 integrated into the laser scanner 32. The display device 64 may include a graphical touch screen 66, as shown in FIG. 2, which allows the operator to set the parameters or initiate the operation of the laser scanner 32. For example, the screen 66 may have a user interface that allows the operator to provide measurement instructions to the device, and the screen may also display measurement results.

The laser scanner 32 includes a carrying structure 68 that provides a frame for the measuring head 40 and a platform for attaching the components of the laser scanner 32. In one embodiment, the carrying structure 68 is made from a metal such as aluminum. The carrying structure 68 includes a traverse member 70 having a pair of walls 72, 74 on opposing ends. The walls 72, 74 are parallel to each other and extend in a direction opposite the base 42. Shells 76, 78 are coupled to the walls 72, 74 and cover the components of the laser scanner 32. In the exemplary embodiment, the shells 76, 78 are made from a plastic material, such as polycarbonate or polyethylene for example. The shells 76, 78 cooperate with the walls 72, 74 to form a housing for the laser scanner 32.

On an end of the shells 76, 78 opposite the walls 72, 74 a pair of yokes 80, 82 are arranged to partially cover the respective shells 76, 78. In the exemplary embodiment, the yokes 80, 82 are made from a suitably durable material, such as aluminum for example, that assists in protecting the shells 76, 78 during transport and operation. The yokes 80, 82 each includes a first arm portion 84 that is coupled, such as with a fastener for example, to the traverse 70 adjacent the base 42. The arm portion 84 for each yoke 80, 82 extends from the traverse 70 obliquely to an outer corner of the respective shell 76, 78. From the outer corner of the shell, the yokes 80, 82 extend along the side edge of the shell to an opposite outer corner of the shell. Each yoke 80, 82 further includes a second arm portion that extends obliquely to the walls 72, 74. It should be appreciated that the yokes 80, 82 may be coupled to the traverse 70, the walls 72, 74 and the shells 76, 78 at multiple locations.

The pair of yokes 80, 82 cooperate to circumscribe a convex space within which the two shells 76, 78 are arranged. In the exemplary embodiment, the yokes 80, 82 cooperate to cover all of the outer edges of the shells 76, 78, while the top and bottom arm portions project over at least a portion of the top and bottom edges of the shells 76, 78. This provides advantages in protecting the shells 76, 78 and the measuring head 40 from damage during transportation and operation. In other embodiments, the yokes 80, 82 may include additional features, such as handles to facilitate the carrying of the laser scanner 32 or attachment points for accessories for example.

On top of the traverse 70, a prism 86 is provided. The prism 86 extends parallel to the walls 72, 74. In the exemplary embodiment, the prism 86 is integrally formed as part of the carrying structure 68. In other embodiments, the prism 86 is a separate component that is coupled to the traverse 70. When the mirror 50 rotates, during each rotation the mirror 50 directs the emitted light beam 54 onto the traverse 70 and the prism 86. Due to non-linearities in the electronic components, for example in the light receiver 60, the measured distances d may depend on signal strength, which may be measured in optical power entering the scanner or optical power entering optical detectors within the light receiver 56, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 60. Since the prism 86 is at a known distance from the gimbal point 46, the measured optical power level of light reflected by the prism 86 may be used to correct distance measurements for other measured points, thereby allowing for compensation to correct for the effects of environmental variables such as temperature. In the exemplary embodiment, the resulting correction of distance is performed by the controller 62.

In an embodiment, the controller 62 represents one or more processors distributed throughout the scanner 32 or external to the scanner 32. The one or more processor may include one or more computing devices connected for communications via a network, such as network 104 of FIG. 1 for example. The computing devices may be arranged in a distributed arrangement to operate cooperatively to process data from the scanner 32. The processors may be microprocessors, field programmable gate arrays (FPGAs), digital signal processors (DSPs), and generally any device capable of performing computing functions. The one or more processors have access to memory (volatile or nonvolatile) for storing information. In addition, one or more of the processors of the controller 62 may provide support for remote computing capability, including communicating with the mobile communication device 102 via the network 104. In another embodiment, only one or more of the processors 62, 98, 100, and 102 may be combined or integrated within the processor system. Communication between the processors may be through a wired, wireless, or a combination of wired and wireless data connection or medium.

In an embodiment, the base 42 is coupled to a swivel assembly (not shown) such as that described in commonly owned U.S. Pat. No. 8,705,012 ('012), which is incorporated by reference herein. The swivel assembly is housed within the carrying structure 68 and includes a motor that is configured to rotate the measurement head 40 about the axis 44. In an embodiment, the motor rotates the measurement head 40 about the axis 44 based on a notification that a movement of a mobile computing device that corresponds to a request to rotate the scanner device has been detected. In an embodiment, scanner firmware code receives movement information from the mobile computing device and translates it into pan and mirror axis rotation of the scanner. In an embodiment, the amount of movement, that is, how much the scanner should move for a given movement of the mobile computing device is adjustable by the user. In another embodiment the amount of movement is automatically adjusted by software. In another embodiment, a fixed translation between scanner movement and movement of the mobile computing device is utilized. In an embodiment, input from the mobile computing device is filtered so that very small movements are not directly applied in order to get a smoother rotation at the scanner. A user interface of the scanner may provide user settings to adjust the filtering.

An auxiliary image acquisition device 88 may be a device that captures and measures a parameter associated with the scanned volume or the scanned object and provides a signal representing the measured quantities over an image acquisition area. The auxiliary image acquisition device 88 may be, but is not limited to, a color camera, pyrometer, a thermal imager, an ionizing radiation detector, or a millimeter-wave detector.

In an embodiment, a camera (first image acquisition device) 90 is located internally to the scanner 32 and may have the same optical axis as the 3D scanner device. In this embodiment, the first image acquisition device 90 is integrated into the measuring head 40 and arranged to acquire images along the same optical pathway as emitted light beam 54 and reflected light beam 56. In this embodiment, the light from the light emitter 52 reflects off a fixed mirror 92 and travels to dichroic beam-splitter 94 that reflects the light 96 from the light emitter 52 onto the rotary mirror 50. The dichroic beam-splitter 94 allows light to pass through at wavelengths different than the wavelength of light 96. For example, the light emitter 52 may be a near infrared laser light (for example, light at wavelengths of 780 nm or 1150 nm), with the dichroic beam-splitter 94 configured to reflect the infrared laser light while allowing visible light (e.g., wavelengths of 400 to 700 nm) to transmit through. In other embodiments, the determination of whether the light passes through the beam-splitter 94 or is reflected depends on the polarization of the light. The digital camera 90 acquires 2D photographic images of the scanned area to capture color data (texture) to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 44 and by steering the mirror 50 about the axis 48.

In an embodiment, the mirror 50 rotates about axis 48 based on a notification, or a receipt of a signal, that a movement of a mobile computing device that corresponds to a request to rotate the mirror has been detected.

Figure 5:
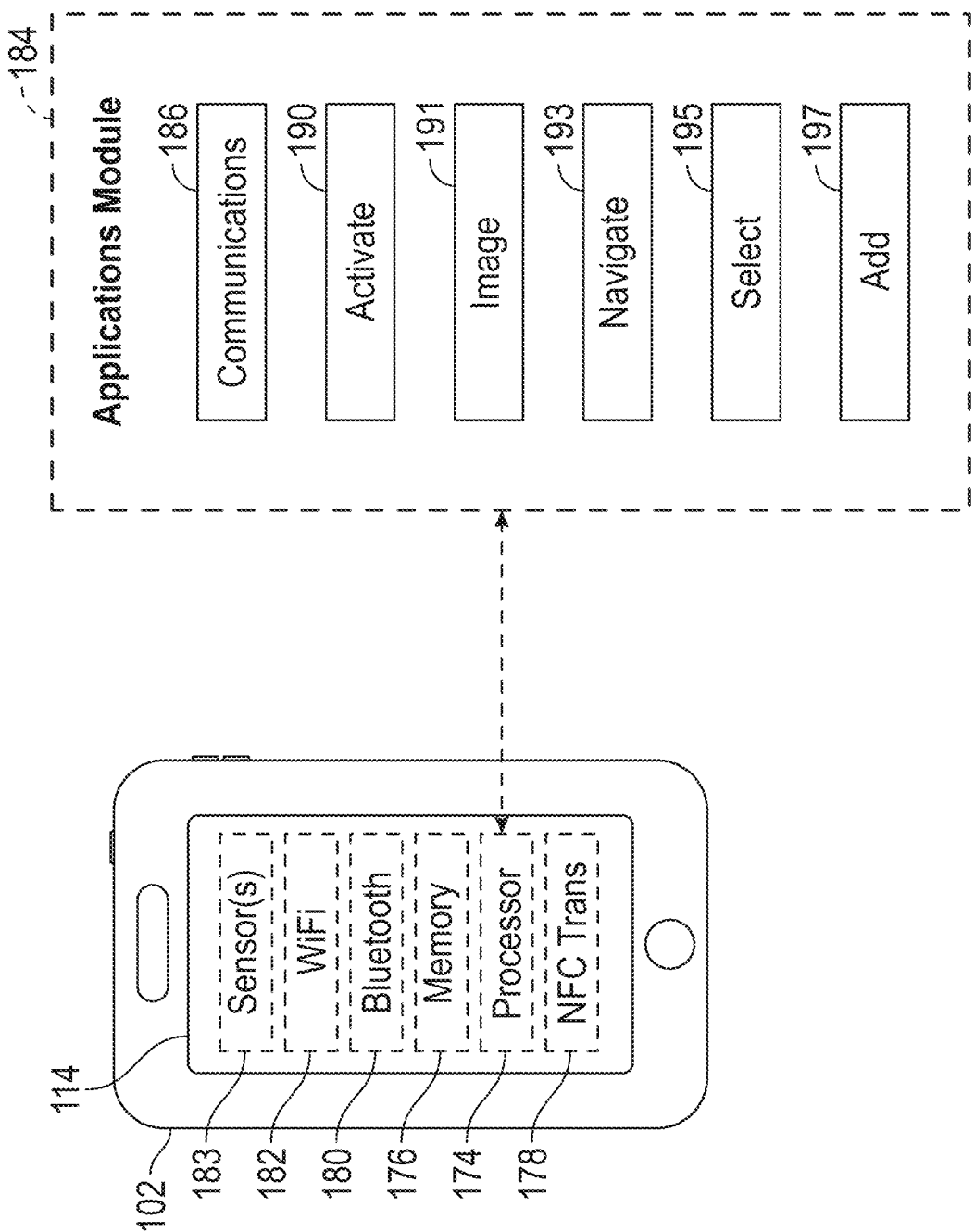
FIG. 5 is a block diagram of a mobile computing device in accordance with one or more embodiments of the present invention.

Referring now to FIG. 5, an embodiment is shown of the mobile computing device 102, such as a smartphone for example. The mobile computing device 102 may also be a cellular telephone, a smart pad, laptop computer, smart music player, or other type of smart device or other portable device having a processor and a suitable communications circuit. In an exemplary embodiment, the mobile computing device 102 includes a display 114 that presents a graphical user interface (GUI) to the user. In one embodiment, the GUI allows the user to view data, such as an image acquired by the camera 90 or measured coordinate data for example, and interact with the mobile computing device 102. In one embodiment, the display 114 is a touch screen device that allows the user to input information and control the operation of the mobile computing device 102 using their fingers.

The mobile computing device 102 further includes one or more processors 174 that are responsive to executable computer instructions and for performing functions or control methods, such as those described herein. The mobile computing device 102 may further include memory 176, such as random access memory (RAM) or read-only memory (ROM) for example, for storing application code that is executed on the processor 174 and storing data, such as coordinate data for example. The mobile computing device 102 further includes communications circuits, such as near field communications (ISO 14443) circuit 178, Bluetooth (IEEE 802.15.1 or its successors) circuit 180 and WiFi (IEEE 802.11) circuit 182 for example. The communications circuits 178, 180, 182 are transceivers, meaning each is capable of transmitting and receiving signals. It should be appreciated that the mobile computing device 102 may include additional components and circuits, such as a cellular communications circuit, as is known in the art.

The mobile computing device 102 shown in FIG. 5 also includes one or more position/orientation sensors 183 which may inclinometers (accelerometers), gyroscopes, and altimeters. The one or more sensors are used to detect and measure motion of the mobile computing device 102. Data about motion of the mobile computing device 102 can be stored in the memory 176 and transmitted to the controller 62 of the laser scanner 32 to change an orientation of the laser scanner 32 about the axis 44 and/or the rotary mirror 50 about the axis 48.

The mobile computing device 102 may further include additional modules or engines 184, which may be in the form of application software that execute on processor 174 and may be stored in memory 176. One such application, such as that described in reference to FIGS. 6-11 for example, is a scanner control application that allows the user to control or issue commands to the laser scanner 32 via the computer network 104. In an embodiment, the engine 184 includes a number of sub-modules that facilitate communication and control of the laser scanner 32 that the engine 184 is connected to.

Figure 6:
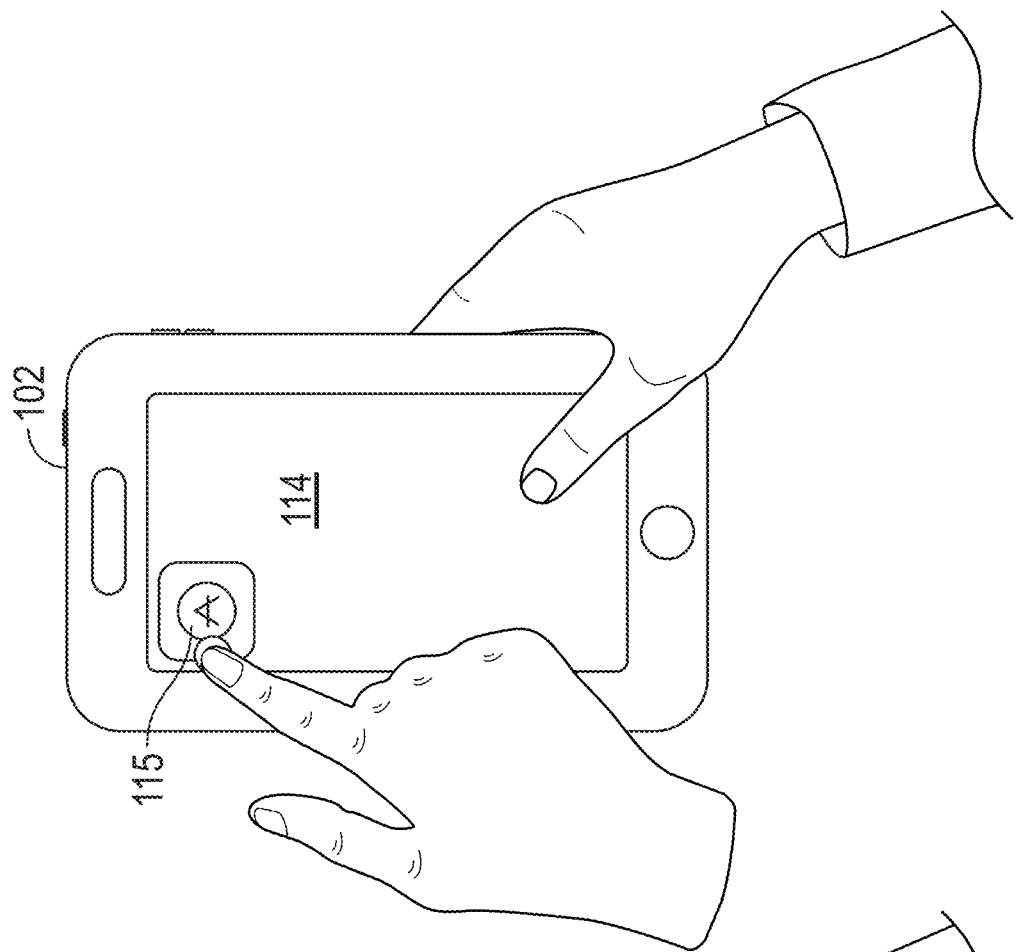
FIG. 6 is a schematic illustration of starting a scanner control application on a mobile device in accordance with one or more embodiments of the present invention.
Figure 6:
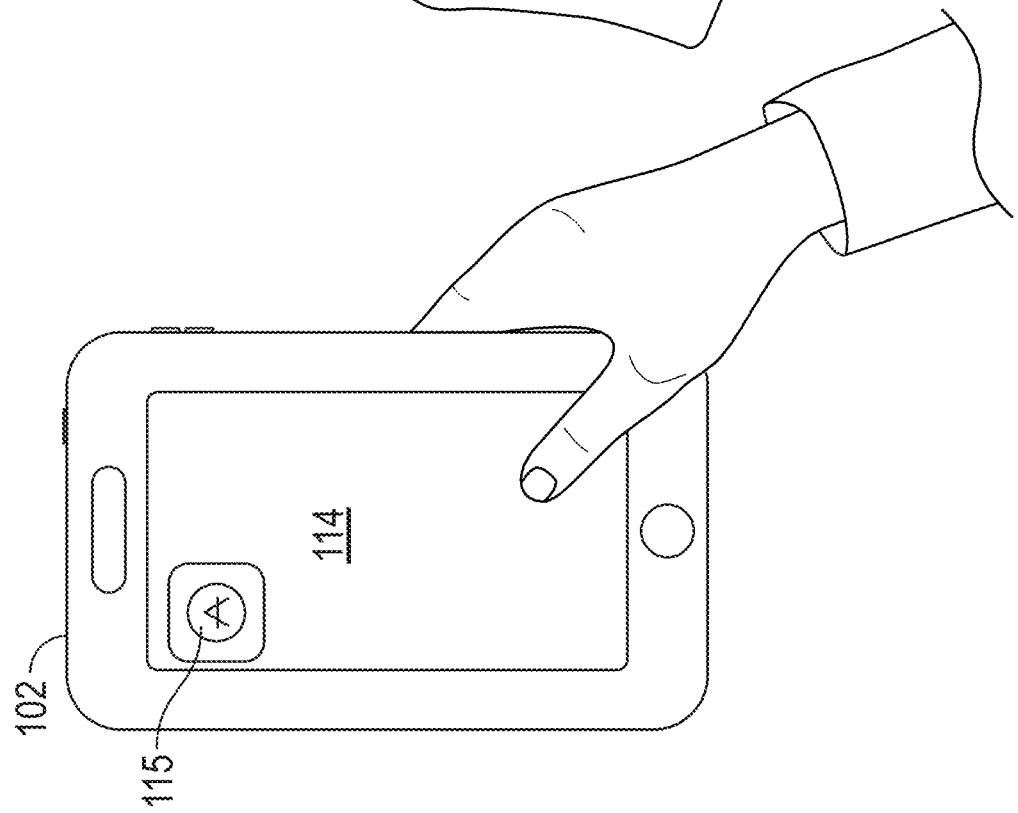

In an embodiment, the engine 184 includes an activate module 190 that starts the scanner control application on the mobile computing device 102. As shown in FIG. 6, the scanner control application can be started by the user selecting an icon 115 on a graphical user interface of the display screen 114.

Figure 7:
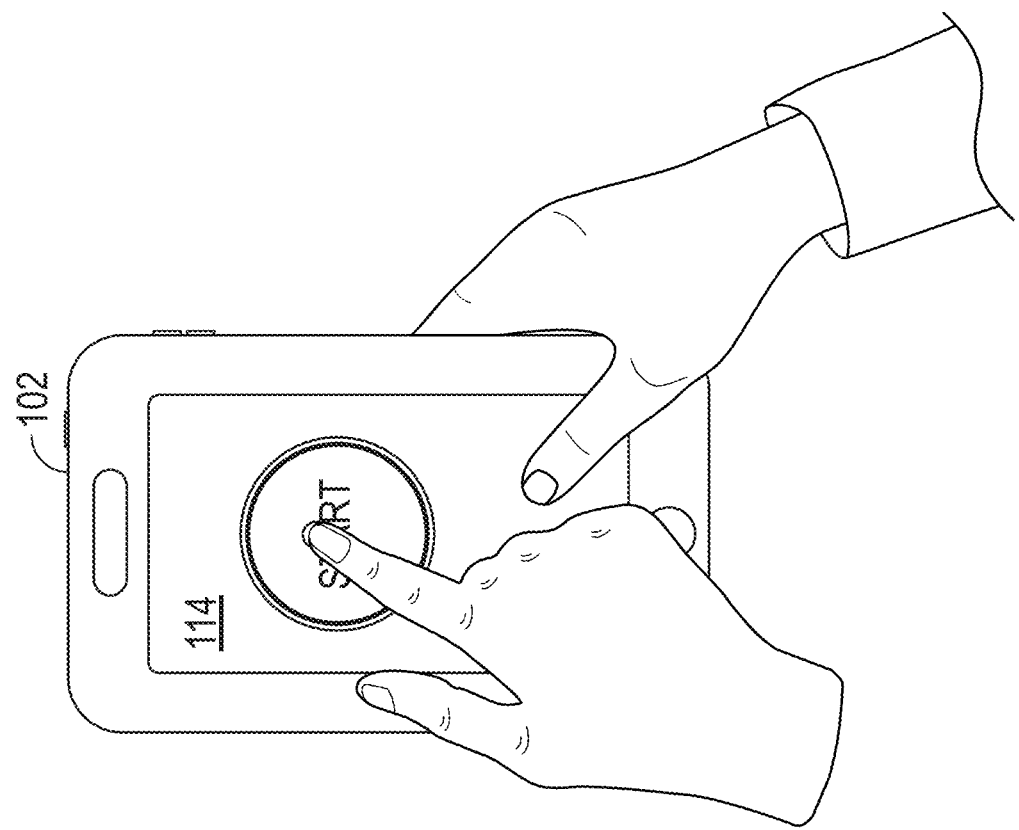
FIG. 7 is a schematic illustration of activating a scanner control application on a mobile device in accordance with one or more embodiments of the present invention.
Figure 7:
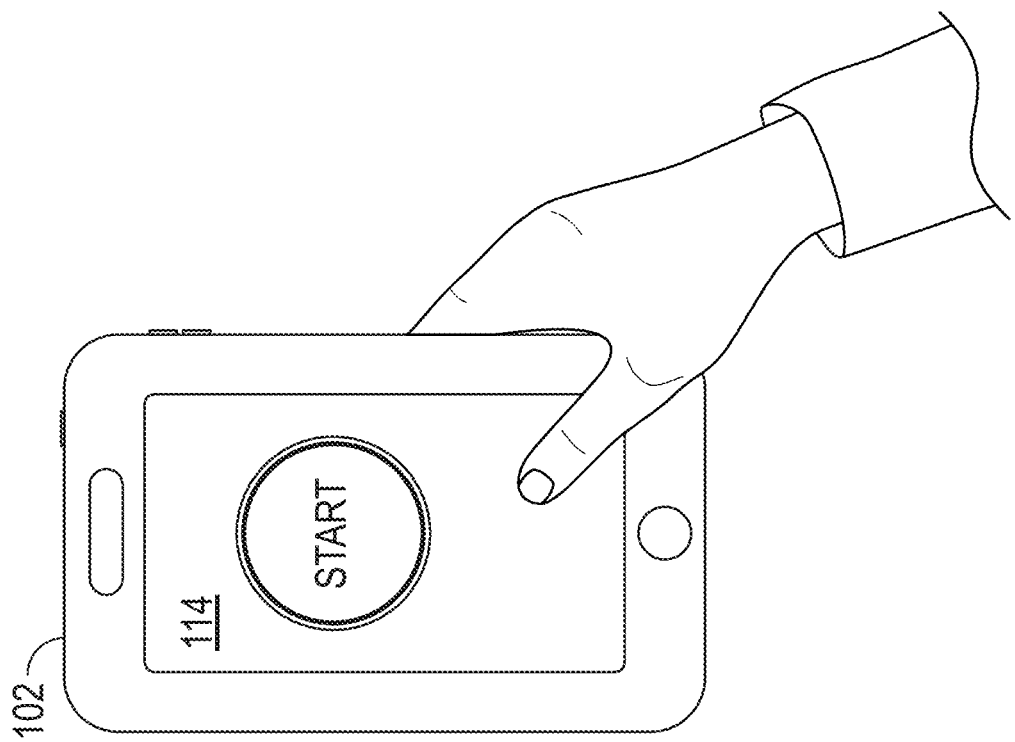

In an embodiment, the engine 184 includes a communications module 186 that provides searching capabilities to identify laser scanners that are connected to the computer network 104 and to establish communications, using the Wifi circuit 182 or Bluetooth circuit 180 for example. In one embodiment, the communications module 186 may query the computer network 104 to identify laser scanner devices that are available. Having compiled a list of devices, the engine 184 may display a list of laser scanners on the display screen 114 of the mobile computing device 102 for selection by the user. The laser scanners can be listed with the serial number or a user definable name The IP or computer network address may also be displayed. The communications module 186 will connect the engine 184 to the selected laser scanner device and allow transmission of signals therebetween once the user selects the laser scanner and selects start on the display screen 114 of the mobile computing device 102 as shown in FIG. 7.

Figure 8:
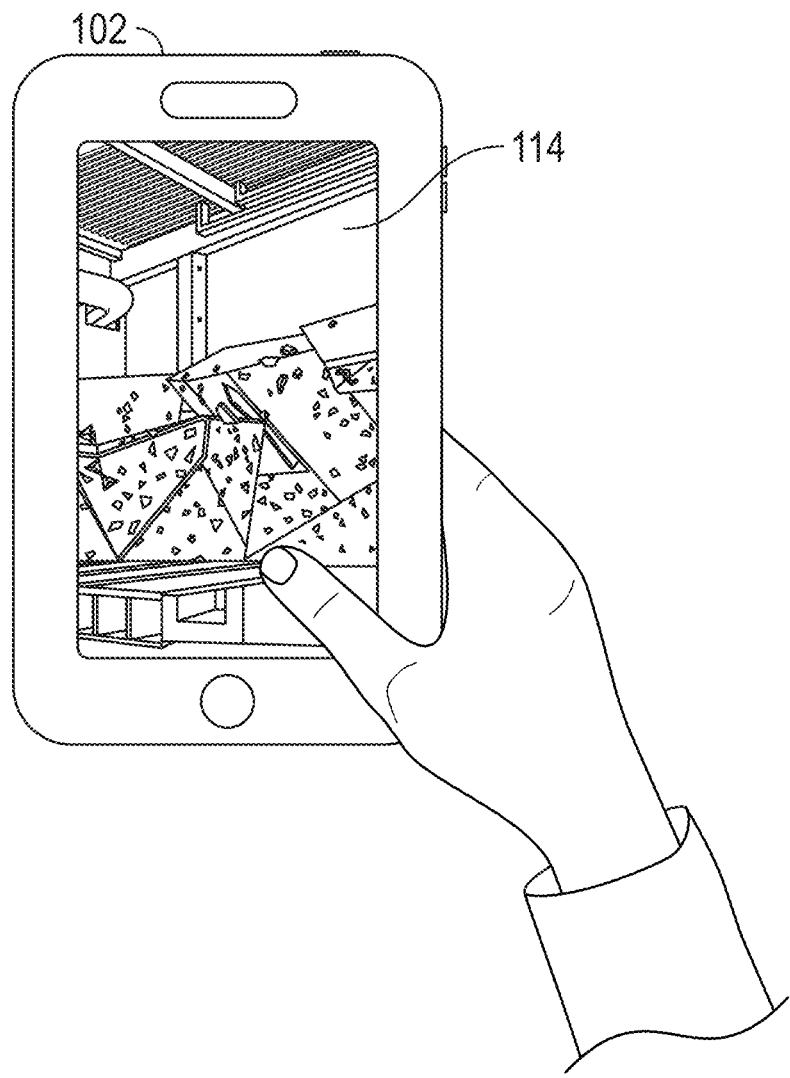
FIG. 8 is a schematic illustration of displaying a current view of a scanner using a mobile device in accordance with one or more embodiments of the present invention.

Once the scanner control application has been initiated and the mobile computing device 102 is in communication with laser scanner, an image module 191 of the scanner control application may be used to view an image, or video, of what the scanner device currently "sees" through the color camera (e.g., camera 90). The color camera can be integrated with the scanner or mounted to an accessory bay of the scanner. As shown in FIG. 8, the user can see on the display screen 114 of the mobile computing device 102 the area that the scanner would measure if it was currently performing measurements. This allows the user to determine whether the current target scan area is the desired scan area before taking the measurements.

Figure 9:
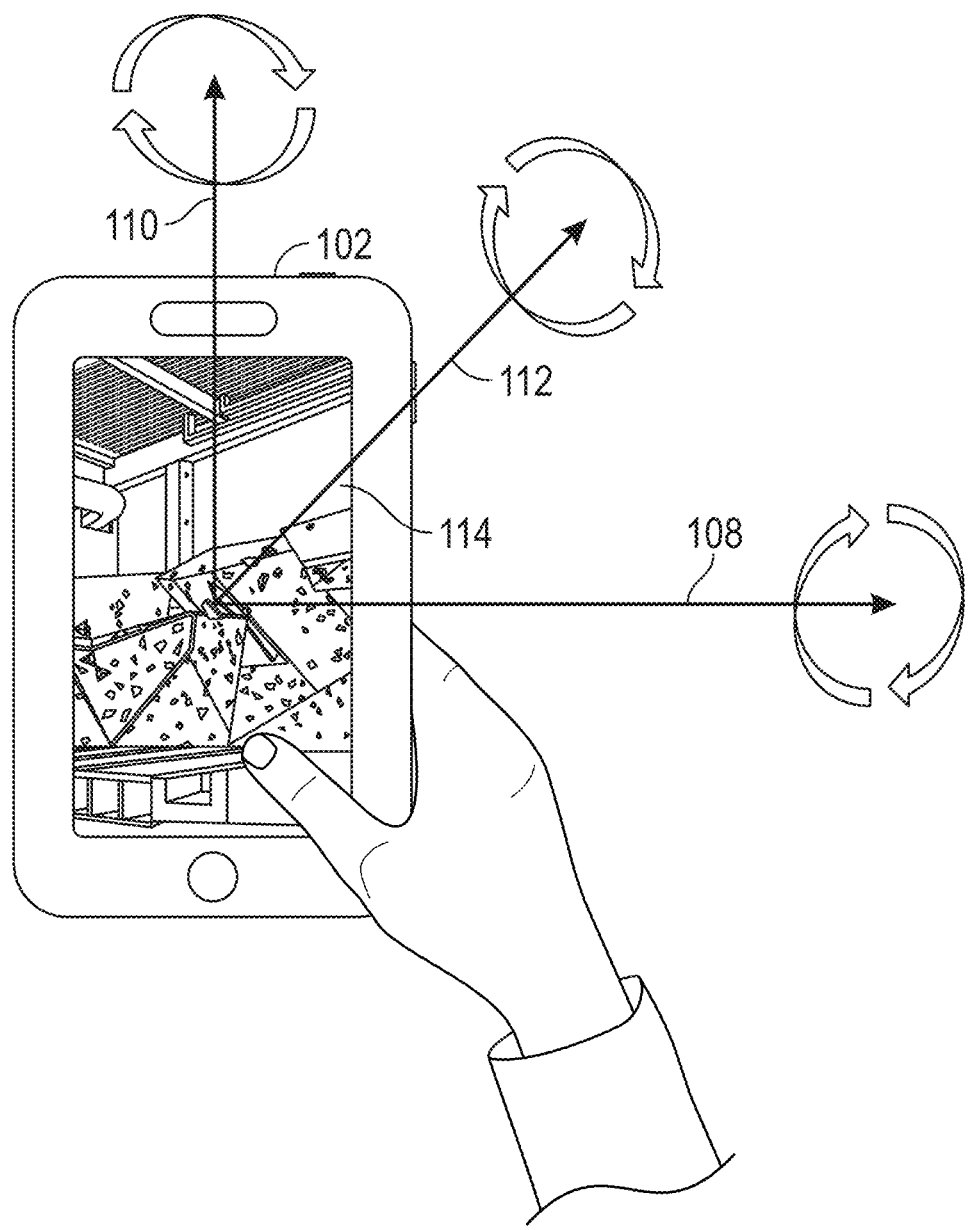
FIG. 9 is a schematic illustration of changing the current view of a scanner using a mobile device in accordance with one or more embodiments of the present invention.
Figure 10:
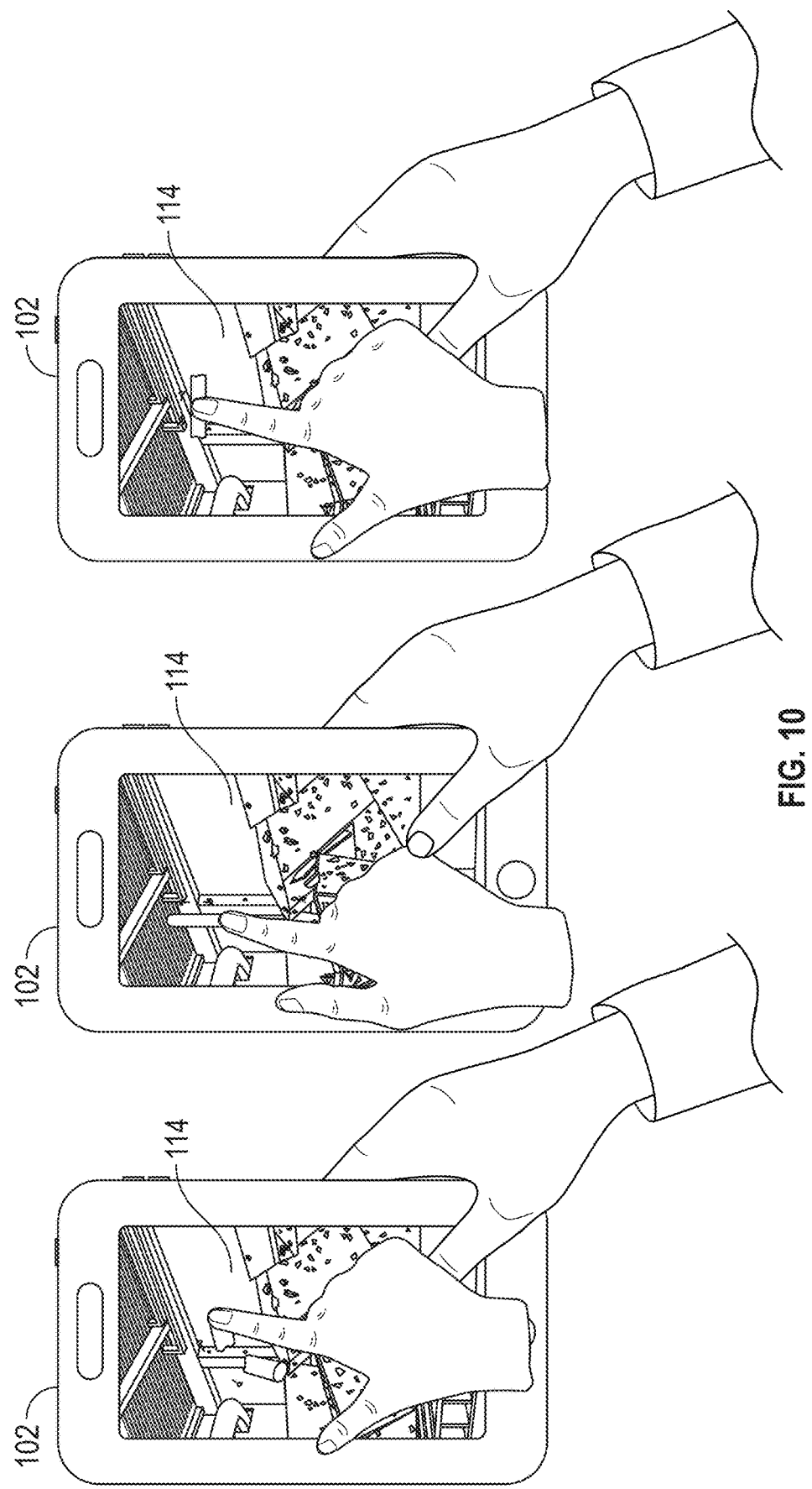
FIG. 10 is a schematic illustration of changing the current view of a scanner using a mobile device in accordance with one or more embodiments of the present invention.

As shown in FIG. 9, the user can navigate, or orient, the scanner to a different target scan area using a navigate module 193 by performing different motions with the mobile computing device 102. The user can control the pan axis (the axis of the scanner, the z-axis 118 in FIG. 1) and the mirror axis (the axis of the rotary mirror, the x-axis 116 in FIG. 1) by moving or motioning with the mobile computing device 102 as shown in FIG. 9. As shown in FIG. 9, the user can motion along three axes of rotation including the X axis 108 (e.g., roll), Y axis 110 (e.g., yaw), and Z axis 112 (e.g., pitch). An internal sensor of the mobile computing device 102, such as an accelerometer(s) 113, can be used to detect the motion of the mobile computing device 102 and to output data indicating movement in each of the three directions. This data is transmitted to the scanner to change the target scan area which is reflected in the image data received back from the scanner in response to the data from the sensor. In an embodiment, the transmitting of motion data to the scanner and receiving an updated image from the camera at the scanner continues until the user determines that the target scan area is the correct target scan area. In this manner, the user can control and change the current target scan area of the scanner.

Figure 11:
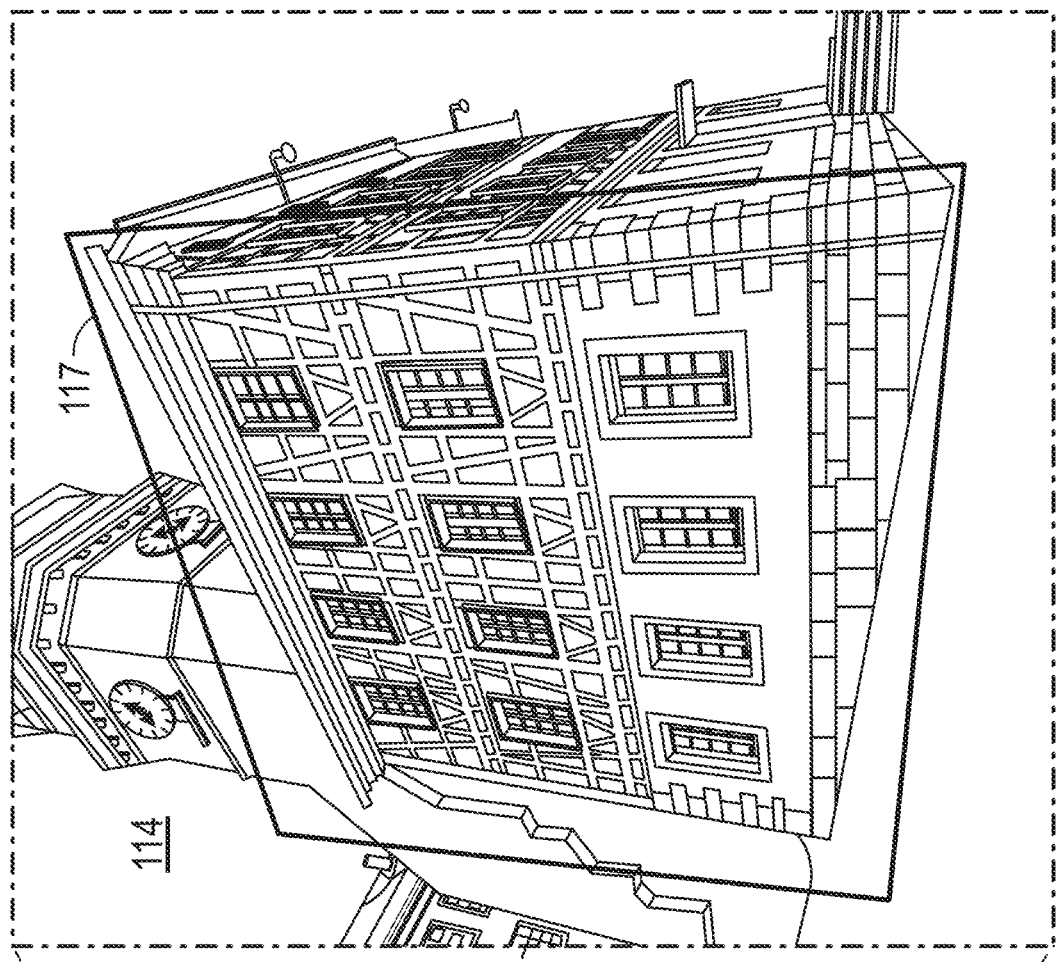
FIG. 11 is a schematic illustration of selecting points of interest in a current view of a scanner using a mobile device in accordance with one or more embodiments of the present invention.
Figure 11:
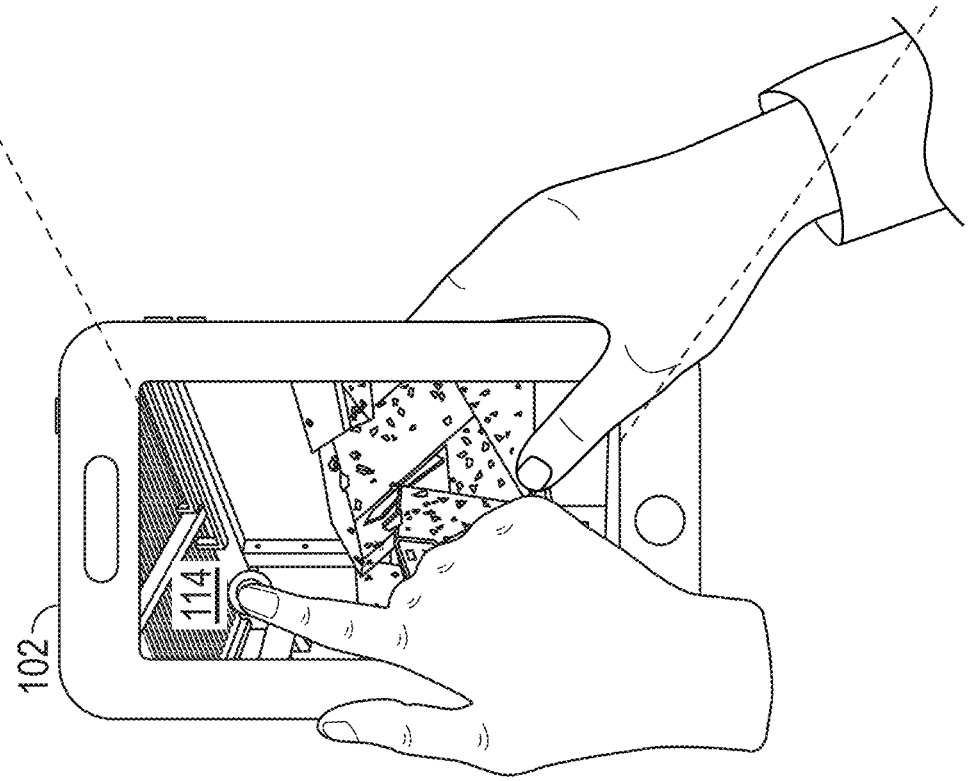

Alternatively, or in addition to the gestures shown in FIG. 9 where the whole mobile computing device 102 is being moved, the user can use swipe/pinch gestures on a touch screen of the display screen 114 to change the orientation of the scanner. In an embodiment, such as that shown in FIG. 10, the orientation of the scanner and the mirror may change based on the swipe/pinch gestures. Once the user has determined that the current view shows the correct target scan area, the user can use a select module 195 (FIG. 5) to select points of interest 117 on the image displayed in the user interface 114 of the mobile computing device 102 as shown in FIG. 11. The user can also use an add module 197 of the scanner control application to record additional data such as, but not limited to pictures, videos, voice messages, web links and/or text for attachment to the scan results for the selected point(s) of interest.

Terms such as processor, controller, computer, DSP, and FPGA are understood in this document to mean a computing device that may be located within an instrument, distributed in multiple elements throughout an instrument, or placed external to an instrument.

It should be appreciated that while embodiments herein refer to the mobile computing device 102 connecting to the 3D scanner device 106 through the computer network 104, this is for exemplary purposes and the claims should not be so limited. In other embodiments, the mobile computing device 102 may directly connect with the 3D scanner device 106, such as using the Bluetooth communications circuit 180, the NFC communications circuit 178 or the WiFi communications circuit 178 for example. In still further embodiments, the mobile computing device 102 may be connected to the 3D scanner device 106 by a wired connection, such as a Universal Serial Bus (USB) connection or an Ethernet connection for example. In other embodiments, the control element may directly connect to the 3D scanner device 106 without going through a network but using a local IP address, usually in combination with an Ethernet cross-over cable.

In some embodiments, the control of the scanner device with the mobile computing device utilizes functionality addressed in the native language of the mobile computing device. Thus, the mobile computing device becomes an extension of the laser scanner device since the mobile computing device is natively and directly controlling the functions of the laser scanner device. This is different from prior art remote controls that utilized remote desktop protocols to access the 3D scanner device 106. In other words, the prior art remote devices controlled the laser scanner with the laser scanner control functions rather than with the remote device itself.

Further, while embodiments herein refer to computer network 104 in terms of a local area network, this is for exemplary purposes and the claims should not be so limited. Rather, embodiments are capable of being implemented in conjunction with any other type of computing environment now known or later developed. For example, the computer network may be in the form of a cloud computing network. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The characteristics of cloud based computing include: on-demand self-service; broad network access; resource pooling; rapid elasticity and measured service. Service models include: software-as-a-service; platform-as-a-service; and infrastructure-as-a-service. Deployment models include: private cloud; community cloud; public cloud; and hybrid cloud.

A cloud computing environment comprises one or more cloud computing nodes with which local computing devices used by cloud consumers, such as, for example, personal digital assistant (PDA) or cellular telephone, desktop computer, or laptop computer may communicate. Nodes may communicate with one another. They may be grouped (not shown) physically or virtually, in one or more networks, such as private, community, public, or hybrid clouds as described hereinabove, or a combination thereof. This allows cloud computing environment to offer infrastructure, platforms and/or software as services for which a cloud consumer does not need to maintain resources on a local computing device. It is understood that the types of computing devices are intended to be illustrative only and that computing nodes and cloud computing environment can communicate with any type of computerized device over any type of network and/or network addressable connection (e.g., using a web browser).

In an embodiment, the engine 184 is partially or wholly arranged in the cloud computing environment. For example, the engine 184 may be stored and executed on one or more nodes and accessed by the mobile computing device 102, such as via a web browser for example. In other embodiments, one or more of the modules 186, 190, 191, 193, 195, 197 are stored or executed on a node in the cloud computing environment.

The cloud computing environment may be defined in terms of a set of abstract layers. These layers may include: a hardware layer; a virtualization layer; and a workloads layer. The engine 183 or the one or more of the modules 186, 190, 191, 193, 195, 197 may be stored or executed in the workloads layer.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A laser scanner system comprising:
a laser scanner device rotatable around a first axis and including a mirror rotatable around a second axis, a first emitter for launching a first light beam from the laser scanner onto a diffuse surface, a distance meter, a first angular encoder for measuring a first angle of rotation of the laser scanner about the first axis, a second angular encoder for measuring a second angle of rotation of the mirror about the second axis, a camera positioned and oriented to acquire an image in the direction of the first light beam after it reflects off of the diffuse surface and is intercepted by the mirror, and one or more first processors; and
a mobile computing device operably coupled for communication to the laser scanner, the mobile computing device including a sensor to detect movement of the mobile computing device, and one or more second processors that are responsive to executable computer instructions, the executable computer instructions when executed on the one or more second processors perform a method comprising:
connecting to the laser scanner to transmit signals between the mobile computing device and the laser scanner;
displaying on a display of the mobile computing device the image acquired from the camera;

detecting, by the sensor, a motion of the mobile computing device;

causing the laser scanner to modify at least one of the first angle of rotation of the laser scanner about the first axis and the second angle of rotation of the mirror about the second axis in response to detecting the motion of the mobile computing device; and continuing to transmit motion data of the mobile computing device to the laser scanner that translates the motion data into one or more movement commands of the laser scanner and receiving an updated image from the camera until a target scan area is selected through the mobile computing device.

2. The laser scanner system of claim 1, wherein the causing comprises the mobile computing device notifying the laser scanner about the detected motion and the laser scanner modifying at least one of the first angle of rotation of the laser scanner about the first axis and the second angle of rotation of the mirror about the second axis responsive to the notifying and to the detected motion.

3. The laser scanner system of claim 1, wherein the laser scanner modifies the first angle of rotation of the laser scanner about the first axis based at least in part on the motion being a movement of the mobile computing device around a third axis, and the laser scanner modifies the second angle of rotation of the mirror about the second axis based at least in part on the motion being a movement of the mobile computing device around a fourth axis.

4. The laser scanner system of claim 1, wherein an amount that the laser scanner modifies the first angle of rotation or the second angle of rotation is based at least in part on a magnitude of the detected motion.

5. The laser scanner system of claim 1, wherein the sensor is an accelerometer.

6. The laser scanner system of claim 1, wherein the mobile computing device is operably coupled for communication to the laser scanner via a computer network.

7. A method comprising:

providing a laser scanner device, the laser scanner device rotatable around a first axis and including a mirror rotatable around a second axis, a first emitter that launches a first light beam from the laser scanner onto a diffuse surface, a distance meter, a first angular encoder that measures a first angle of rotation of the laser scanner about the first axis, a second angular encoder that measures a second angle of rotation of the mirror about the second axis, and a camera positioned and oriented to acquire an image in the direction of the first light beam after it reflects off of the diffuse surface and is intercepted by the mirror;

providing a mobile computing device operably coupled for communication to the laser scanner, the mobile computing device including a sensor to detect movement of the mobile computing device, the mobile communicating device:

connecting to the laser scanner to transmit signals between the mobile computing device and the laser scanner;

displaying on a display of the mobile computing device the image acquired from the camera;

detecting, by the sensor, a motion of the mobile computing device;

causing the laser scanner to modify at least one of the first angle of rotation of the laser scanner about the first axis and the second angle of rotation of the mirror about the second axis in response to detecting the motion of the mobile computing device; and continuing to transmit motion data of the mobile computing device to the laser scanner that translates the motion data into one or more movement commands of the laser scanner and receiving an updated image from the camera until a target scan area is selected through the mobile computing device.

8. The method of claim 7, the causing comprises the mobile computing device notifying the laser scanner about the detected motion and the laser scanner modifying at least one of the first angle of rotation of the laser scanner about the first axis and the second angle of rotation of the mirror about the second axis responsive to the notifying and to the detected motion.

9. The method of claim 7, wherein the laser scanner modifies the first angle of rotation of the laser scanner about the first axis based at least in part on the motion being a movement of the mobile computing device around a third axis, and the laser scanner modifies the second angle of rotation of the mirror about the second axis based at least in part on the motion being a movement of the mobile computing device around a fourth axis.

10. The method of claim 7, wherein an amount that the laser scanner modifies the first angle of rotation or the second angle of rotation is based at least in part on a magnitude of the detected motion.

11. The method of claim 7, wherein the sensor is an accelerometer.

12. The method of claim 7, wherein the mobile computing device is operably coupled for communication to the laser scanner via a computer network.

13. A laser scanner system comprising:

a laser scanner device, the laser scanner device rotatable around a first axis and including a mirror rotatable around a second axis, a first emitter that launches a first light beam from the laser scanner onto a diffuse surface, a distance meter, a first angular encoder that measures a first angle of rotation of the laser scanner about the first axis, a second angular encoder that measures a second angle of rotation of the mirror about the second axis, a camera positioned and oriented to acquire an image in the direction of the first light beam after it reflects off of the diffuse surface and is intercepted by the mirror, and one or more first processors that are responsive to executable instructions, the executable instructions when executed on the one or more first processors perform a method comprising:

connecting to a mobile computing device to transmit signals between the mobile computing device and the laser scanner;

receiving a notification from the mobile communication device about a detected motion of the mobile communication device; and modifying at least one of the first angle of rotation of the laser scanner about the first axis and the second angle of rotation of the mirror about the second axis in response to receiving the notification and responsive to the detected motion; and continuing to receive motion data of the mobile computing device and translating the motion data into one or more movement commands of the laser scanner until a target scan area is selected through the mobile computing device, wherein the mobile computing device receives and displays an updated image from the camera until the target scan area is selected through the mobile computing device.

14. The laser scanner system of claim 13, wherein the modifying includes modifying at least one of the first angle of rotation of the laser scanner about the first axis and the second angle of rotation of the mirror about the second axis.

15. The laser scanner system of claim 13, wherein the modifying includes modifying the first angle of rotation of the laser scanner about the first axis based at least in part on the detected motion being a movement of the mobile computing device around a third axis, and modifying the second angle of rotation of the mirror about the second axis based at least in part on the detected motion being a movement of the mobile computing device around a fourth axis.

16. The laser scanner system of claim 13, wherein an amount that the first angle of rotation or the second angle of rotation is modified is based at least in part on a magnitude of the detected motion.

17. The laser scanner system of claim 16, wherein the amount is adjustable.

18. The laser scanner system of claim 13, wherein the connecting is via a computer network.

* * * * *